(12) United States Patent
Campion et al.

(10) Patent No.: US 8,706,869 B2
(45) Date of Patent: Apr. 22, 2014

(54) DISTRIBUTED CLOUD PLACEMENT SOFTWARE

(75) Inventors: Nicholas F. Campion, Rochester, MN (US); Jeremiah D. Carlin, Rochester, MN (US); Renier Rodriguez Morales, Gurabo, PR (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 13/159,709

(22) Filed: Jun. 14, 2011

(65) Prior Publication Data

US 2012/0324070 A1 Dec. 20, 2012

(51) Int. Cl.
*G06F 15/16* (2006.01)
*G06F 15/173* (2006.01)

(52) U.S. Cl.
USPC ............ 709/224; 709/219; 709/223; 709/226

(58) Field of Classification Search
USPC ................................................. 709/223, 224
See application file for complete search history.

(56) References Cited

U.S. PATENT DOCUMENTS

| | | | |
|---|---|---|---|
| 7,454,462 B2 | 11/2008 | Belfiore et al. | |
| 7,533,164 B2 * | 5/2009 | Volz et al. | 709/223 |
| 7,702,725 B2 * | 4/2010 | Erickson et al. | 709/203 |
| 7,725,559 B2 * | 5/2010 | Landis et al. | 709/215 |
| 7,886,021 B2 * | 2/2011 | Scheifler et al. | 709/217 |
| 7,953,885 B1 * | 5/2011 | Devireddy et al. | 709/238 |
| 8,010,679 B2 * | 8/2011 | Low et al. | 709/227 |
| 8,087,025 B1 * | 12/2011 | Graupner | 718/104 |
| 8,131,839 B2 * | 3/2012 | Yu et al. | 709/224 |
| 8,135,818 B2 * | 3/2012 | Heim | 709/223 |
| 8,150,904 B2 * | 4/2012 | Queck et al. | 709/201 |
| 8,200,738 B2 * | 6/2012 | Roush et al. | 709/201 |
| 8,214,838 B2 * | 7/2012 | Cherkasova et al. | 718/104 |
| 8,230,070 B2 * | 7/2012 | Buyya et al. | 709/226 |
| 8,239,538 B2 * | 8/2012 | Zhang et al. | 709/226 |
| 8,244,882 B2 * | 8/2012 | Davidson | 709/228 |
| 8,261,317 B2 * | 9/2012 | Litvin et al. | 726/1 |
| 8,280,790 B2 * | 10/2012 | Lappas et al. | 705/34 |
| 8,280,945 B2 * | 10/2012 | Putzolu | 709/202 |
| 8,281,305 B2 * | 10/2012 | Otani | 718/1 |
| 8,285,681 B2 * | 10/2012 | Prahlad et al. | 707/640 |
| 8,296,434 B1 * | 10/2012 | Miller et al. | 709/226 |
| 8,301,859 B2 * | 10/2012 | Heim | 711/170 |

(Continued)

OTHER PUBLICATIONS

Wei, Qingsong et al., CDRM: A Cost-effective Dynamic Replication Management Scheme for Cloud Storage Cluster, 2010 IEEE International Conference on Cluster Computing, Sep. 20-24, 2010, pp. 188-196, IEEE Computer Society, Heraklion, Greece.

(Continued)

*Primary Examiner* — Melvin H Pollack
(74) *Attorney, Agent, or Firm* — Kevin D. Kehe; Grant A. Johnson

(57) ABSTRACT

Techniques are described for distributed placement of a request on one of a plurality of deployment nodes. Embodiments receive a request specifying resource requirements for instantiating the request, and transmit at least an indication of the resource requirements to the plurality of deployment nodes. An indication of suitability is then received from at least two of the plurality of deployment nodes, the indication of suitability describing a suitability of the respective deployment node for instantiating the request. Embodiments select one of the at least two deployment nodes based on the indications of suitability, and transmit the request to the selected deployment node for instantiation.

27 Claims, 9 Drawing Sheets

(56) References Cited

U.S. PATENT DOCUMENTS

| | | | |
|---|---|---|---|
| 8,307,177 B2* | 11/2012 | Prahlad et al. | 711/162 |
| 8,407,723 B2* | 3/2013 | Lind et al. | 719/316 |
| 8,473,594 B2* | 6/2013 | Astete et al. | 709/223 |
| 2005/0193103 A1 | 9/2005 | Drabik | |
| 2009/0010204 A1* | 1/2009 | Pratt et al. | 370/328 |
| 2009/0254660 A1 | 10/2009 | Hanson et al. | |
| 2010/0088205 A1* | 4/2010 | Robertson | 705/34 |
| 2010/0138830 A1* | 6/2010 | Astete et al. | 718/1 |
| 2010/0205304 A1* | 8/2010 | Chaturvedi et al. | 709/226 |
| 2010/0250744 A1 | 9/2010 | Hadad et al. | |
| 2010/0250868 A1* | 9/2010 | Oshins | 711/154 |
| 2011/0004574 A1* | 1/2011 | Jeong et al. | 706/12 |
| 2011/0022861 A1* | 1/2011 | Agneeswaran et al. | 713/310 |
| 2011/0029675 A1* | 2/2011 | Yeow et al. | 709/226 |
| 2011/0219114 A1* | 9/2011 | Yang et al. | 709/224 |
| 2011/0246647 A1* | 10/2011 | Marquezan et al. | 709/224 |
| 2011/0258320 A1* | 10/2011 | Jackson | 709/226 |
| 2011/0296486 A1* | 12/2011 | Burch et al. | 726/1 |
| 2011/0307715 A1* | 12/2011 | Diab | 713/300 |
| 2012/0066665 A1* | 3/2012 | Kunze | 717/124 |
| 2012/0078915 A1* | 3/2012 | Darcy | 707/747 |
| 2012/0110651 A1* | 5/2012 | Van Biljon et al. | 726/4 |
| 2012/0117244 A1* | 5/2012 | Melander et al. | 709/226 |
| 2012/0174094 A1* | 7/2012 | LeMahieu et al. | 718/1 |
| 2012/0179823 A1* | 7/2012 | Hatasaki et al. | 709/226 |
| 2012/0198442 A1* | 8/2012 | Kashyap et al. | 718/1 |
| 2012/0221611 A1* | 8/2012 | Watanabe et al. | 707/827 |
| 2012/0226799 A1* | 9/2012 | Kapur et al. | 709/224 |
| 2012/0239792 A1 | 9/2012 | Banerjee et al. | |
| 2012/0250686 A1* | 10/2012 | Vincent et al. | 370/392 |
| 2012/0254867 A1* | 10/2012 | Lind et al. | 718/1 |
| 2012/0260228 A1* | 10/2012 | Mallick et al. | 717/104 |
| 2012/0284707 A1* | 11/2012 | Janakiraman | 718/1 |
| 2013/0060839 A1* | 3/2013 | Van Biljon et al. | 709/203 |

OTHER PUBLICATIONS

Cuesta, Eduardo Huedo, Cloud Computing & Grid, Curso Grid y e-Ciencia 2010, Jul. 6-9, 2010, Distributed Systems Architecture Research Group, Madrid, Spain.

Banatre, Michel, Adaptive Placement of Method Executions within a Customizable Distributed Object-Based Runtime System: Design, Implementation, and Performance, Fifteenth International Conference on Distributed Computing Systems, May 30-Jun. 2, 1995, Vancouver, BC, Canada.

Van Beek, P. et al., Virtualization of worker nodes, Feb. 2, 2010, BiG Grid: the dutch e-science grid, The Netherlands, <https://wiki.nbic.nl/index.php/BigGrid_virtualisatie>.

Montero, Ruben S. et al, An elasticity model for High Throughout Computing Clusters, Journal of Parallel Distributed Computing, May 24, 2010, <doi:10.1016/j.jpdc.2010.05.005>.

Mell, Peter et al., The NIST Definition of Cloud Computing, National Institute of Standards and Technology, Oct. 7, 2009, Version 15, NIST, Gaithersburg, MD, US.

Bai, Wang et al., Cloud Computing (3), Sep. 13, 2010, printed at http://bit.ly/aEUefL.

Artur Andrzejak et al., Volunteer Computing in the Clouds, printed Jan. 14, 2011 at http://www.google.com/url?sa=t&source=web&cd=10&ved=0CE4QFjAJ&url=http://boinc.berkeley.edu/trac/raw-attachment/wiki/WorkShop10/1_pdfsam_kondo_boinc10.pdf&rct=j&q=cloud%20servers%20bid%20on%20take%20workload%20broker&ei=utW0TOjcOIG0IQeJsK2WDA&usg=AFQjCNHW2eotTLFLH4pQh71XhCtbB6RQCQ&sig2=sqUE3_wPHwmV1oBIIXH64w&cad=r.

* cited by examiner

DISTRIBUTED CLOUD PLACEMENT SOFTWARE

BACKGROUND

Embodiments presented in this disclosure generally relate to providing access to cloud resources, and more particularly, to identifying an optimal location within a cloud for instantiating a new cloud service.

Cloud computing has become a popular approach for obtaining access to (sometimes large-scale) computing resources. Cloud computing allows users to deploy virtualized computing systems which include compute, networking, application, and storage resources, without having to build or maintain a physical computing infrastructure. The virtualized computing system may provide a user with a segmented computing system located in the cloud, typically alongside virtualized computing systems of other users. Such a virtualized computing system may be rapidly scaled up (or down) according to the computing needs of a given user without the need to maintain excess computing capacity between peak demand periods. For example, an online retailer can scale a virtualized computing system to meet increased demand during the holiday shopping season without having to maintain the underlying physical computing infrastructure used to provide the retailer's online presence.

Often times, a cloud computing environment is created using multiple deployment nodes, with each node providing various computing resources to the cloud. Such cloud nodes are frequently located in different geographical locations. Furthermore, the resources that each cloud node provides to the cloud may differ. For example, a first cloud node may provide higher performance computing resources than a second cloud node, or may provide localized storage access to particular storage resources that are not provided at all by the second cloud node. Additionally, the workloads of the cloud nodes may differ as well. For instance, while the computing resources of the first cloud node may be operating at 90% capacity, the computing resources of the second cloud may only be operating at 20% capacity. As the capability and availability of the cloud nodes can vary, it is important to intelligently place new workloads onto suitable cloud nodes in order to ensure efficient utilization of the cloud resources.

SUMMARY

Embodiments of the invention provide a method, computer program product and system for instantiating a request, specifying one or more resource requirements, on a deployment node of a plurality of deployment nodes. The method, computer program product and system include transmitting at least an indication of the resource requirements specified in the request to a plurality of deployment nodes. Additionally, the method, computer program product and system include receiving, from each of at least two of the plurality of deployment nodes, an indication of suitability of the respective deployment node for instantiating the request. The method, computer program product and system further include selecting a first one of the at least two deployment nodes for instantiating the request, based on the received indications of suitability. Furthermore, the method, computer program product and system include transmitting the request to the first selected deployment node for instantiation.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
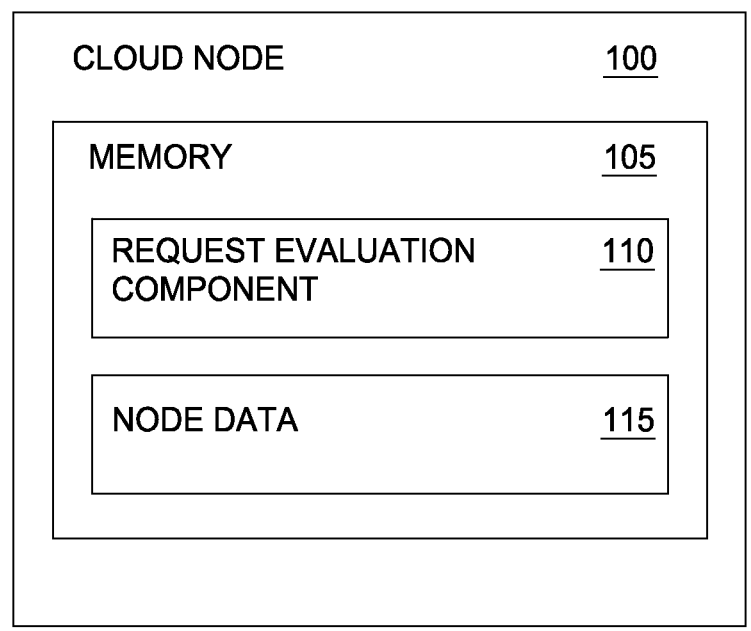
FIGS. 1A-1B illustrate systems configured to perform distributed request placement in a cloud, according to embodiments of the present invention.

Embodiments of the invention generally provide techniques for distributed placement of requests to one of a plurality of interconnected nodes. Embodiments may receive a request specifying one or more resource requirements for instantiating a request, and may transmit an indication of the resource requirements to each of the plurality of interconnected nodes. An indication of suitability may be received from each of the nodes which describes how suitable the respective node is for instantiating the request. Embodiments may select one of the nodes for instantiating the request, based on the indications of suitability, and may transmit the request to the selected node for instantiation.

Advantageously, doing this improves both scalability and reliability for the computer system as a whole, as compared to conventional centralized management stack approaches, where the centralized management stack contains both the logic and data necessary to evaluate the suitability of each of the nodes. That is, while a centralized management stack may prove to be a bottleneck for a substantial number of nodes and/or processing a substantial number of requests, embodiments of the invention utilize a distributed placement approach in which each node evaluates its own suitability for processing a particular request. Accordingly, when the hardware of a cloud node is updated, only the node information on the node itself needs to be updated to account for the new node hardware. This, in turn, makes for an easier and more efficient upgrade process for the nodes.

Furthermore, failover may prove difficult for the conventional management stack, since all the suitability logic and data is contained within the management stack, and thus any failover management stack must also have access to this logic and data. In contrast, and as a further advantage, embodiments of the invention may failover to a backup management stack more easily since the logic for determining the suitability of the nodes is contained on the nodes themselves. In other words, the backup management stack used in accordance with embodiments of the invention may simply be any management stack capable of evaluating suitability values and does not need to know or access to any node-specific logic or data in order to place requests on suitable nodes within the cloud. This, in turn, may improve the reliability of the computer system as a whole.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "The NIST Definition of Cloud Computing" by Peter Mell and Tim Grance, dated Oct. 7, 2009, which is herein incorporated by reference in its entirety.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1B:
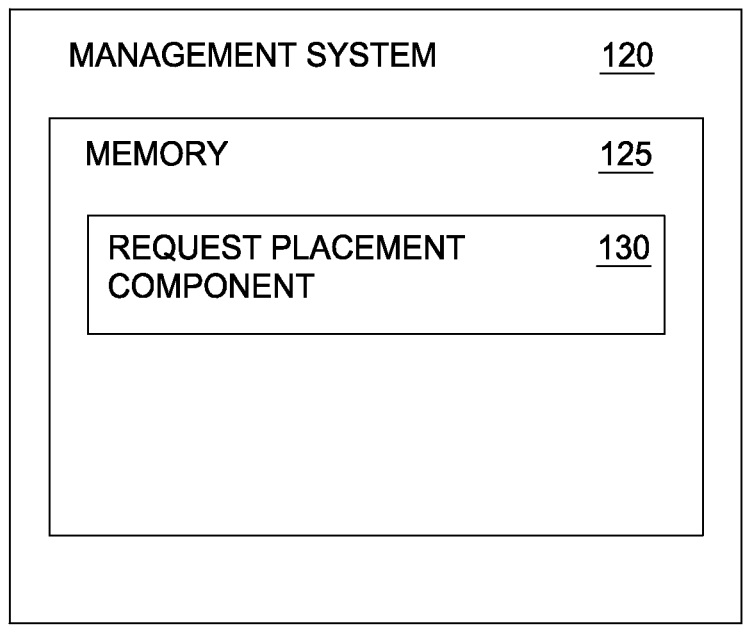

Referring now to FIGS. 1A-1B, FIGS. 1A-1B illustrate systems configured to perform distributed request placement in a cloud, according to embodiments of the present invention. As shown, FIG. 1A depicts a cloud node 100 containing a memory 105. As used herein, a cloud node (also referred to herein as a "deployment node") refers to any entity which provides resources to the cloud. The memory 105, in turn, contains a request evaluation component 110 and node data 115. The request evaluation component 110 is generally configured to evaluate the cloud node's 100 suitability for processing various requests. An example of such a request may include an image of a virtual machine to instantiate on the cloud node 100. The node data 115 generally contains information about the capabilities of the cloud node 100. For instance, the node data 115 may contain hardware specification information about the cloud node 100 (e.g., number of processors, amount of memory, etc.). Additionally, the node data 115 may also contain current workload information about the cloud node 100 (e.g., processor load, amount of available memory, etc.). The node data 115 may also contain information about the availability of various entities either locally on the cloud node 100 or remotely from the cloud node 100 (e.g., using a network). Such entities may include various filesystem data, databases, applications, and so on.

FIG. 1B depicts a management system 120 containing a memory 125. The memory 125, in turn, contains a request placement component 130. The request placement component 130 is generally configured to transmit resource requirements associated with requests to the cloud nodes 100 and to select one of the cloud nodes 100 for instantiating each requests, based on indicators of suitability received from the cloud nodes 100. In one embodiment, the received request includes an image of a virtual machine to be instantiated on one of the cloud nodes 100 of the cloud. Upon receiving a new request for instantiation in the cloud, the request placement component 130 may identify resource requirements associated with the request and may transmit these resource requirements to all (or a subset) of the cloud nodes 100 in the cloud. The resource requirements generally represent resources or characteristics of resources that should be present on the cloud node 100 instantiating the request. As an example, a particular request may specify that the cloud node 100 the request is instantiated on should include at least 4 CPU's, 8 GB of memory, and 100 GB of storage. These resource requirements may be explicitly defined in the received request. Additionally, in an embodiment where the request includes an image of a virtual machine, the resource requirements for instantiating the request may be the resource requirements of the virtual machine specified in the request. In one embodiment, the request placement component 130 may determine the particular resource requirements for the request based on particular characteristics of the request. For instance, the request placement component 130 may determine the resource requirements based on which requesting entity the request was received from, or may determine the resource requirements based on a classification of the request.

Responsive to transmitting the resource requirements to the cloud nodes 100, the request placement component 130 may receive indications of suitability from the cloud nodes 100. The indications of suitability generally describe the suitability of the respective cloud nodes 100 for instantiating the request. For instance, the indication of suitability may reflect whether the cloud node 100 has sufficient computing resources to satisfy the resource requirements of the request. Using the above example of a request that requires 4 CPU's, 8 GB of memory and 100 GB of storage, if a particular node only has 2 CPUs, the node may transmit a suitability indicator to the request placement component 130 that indicates the node is ill-suited for instantiating the request.

Additionally, the indication of suitability may be based on an overprovisioning optimization objective. That is, a particular computing environment may be configured such that workloads should be spread as evenly as possible across all the nodes of the environment. Accordingly, in such an environment, the indication of suitability may reflect a current workload of the cloud node 100. For instance, if the overall computing resources of a particular cloud node 100 are predominantly idle, the indication of suitability for that cloud node 100 may reflect that the node is more suitable for processing new requests. Likewise, if the cloud node 100 is experiencing a heavy workload overall, the indication of suitability may reflect the node is less suitable for processing any new request. In another embodiment, the computing environment may be optimized according to an energy management objective, such that the workloads of the nodes should be densely packed onto the nodes, so that more of the nodes may power off or use an energy saving mode.

In one embodiment of the invention, the indication of suitability may further reflect the availability of resources related to the request. For instance, if the request specifies an image for a virtual machine that accesses a particular database, if one of the cloud nodes 100 is unable to access that database, that cloud node 100 may transmit an indication of suitability indicating the node is not suited for instantiating the request. Likewise, if another of the cloud nodes 100 not only has access to the particular database, but has local network access to the database, the other cloud node may transmit an indication of suitability indicating the other node is particularly well-suited for instantiating the request.

Generally, any technique capable of describing the suitability of a particular node for instantiating a request may be used for the indication of suitability. For instance, the indication of suitability may be expressed using a numeric metric (e.g., a value from 1 to 100). In such an embodiment, a higher numeric value may indicate that the node is more suited for instantiating the request, while a lower value indicates that the node is less suited for instantiating the request. In another embodiment, the indication of suitability may be expressed using a letter grade for each of the nodes (e.g., "A" indicating best suited, while "F" indicates not suitable). Of course, the examples provided here are without limitation and are provided for illustrative purposes only. Moreover, one of ordinary skill in the art will quickly recognize that any number of other techniques may be used to express the suitability of a particular cloud node, in accordance with embodiments of the invention.

Upon receiving the indications of suitability from the cloud nodes 100, the request placement component 130 may select one of the cloud nodes 100 for instantiating the request. The request placement component 130 may then transmit the request to the selected cloud node 100 for instantiation. Advantageously, doing this provides a distributed model for request placement in the cloud that improves both scalability and reliability of the cloud system. That is, since the suitability analysis is performed by each of the nodes (as opposed to the management system 120), the management system 120 may more easily scale to higher workload environments involving a substantial number of requests and/or a substantial number of cloud nodes 100.

Additionally, since the suitability analysis for each of the cloud nodes 100 is not performed on the management system 120, the system may more easily failover to a backup management system in the event of system failure of the system 120. That is, since the request placement component 130 selects one of the nodes based on the received indications of suitability (but does not calculate suitability values itself), the request placement component 130 does not need logic or data relating to the particular capabilities and workloads of the cloud nodes 100. As such, the request placement functionality may more easily and quickly failover to a backup management system in the event of a failure of the management system 120. Moreover, it is explicitly contemplated that the request placement component 130 may reside on one of the cloud nodes 100 in the cloud. In such a scenario, if the cloud node 100 hosting the request placement component 130 fails, another instance of the request placement component 130 may be spawned on another of the cloud nodes 100 and assume the role of processing new requests.

Figure 2:
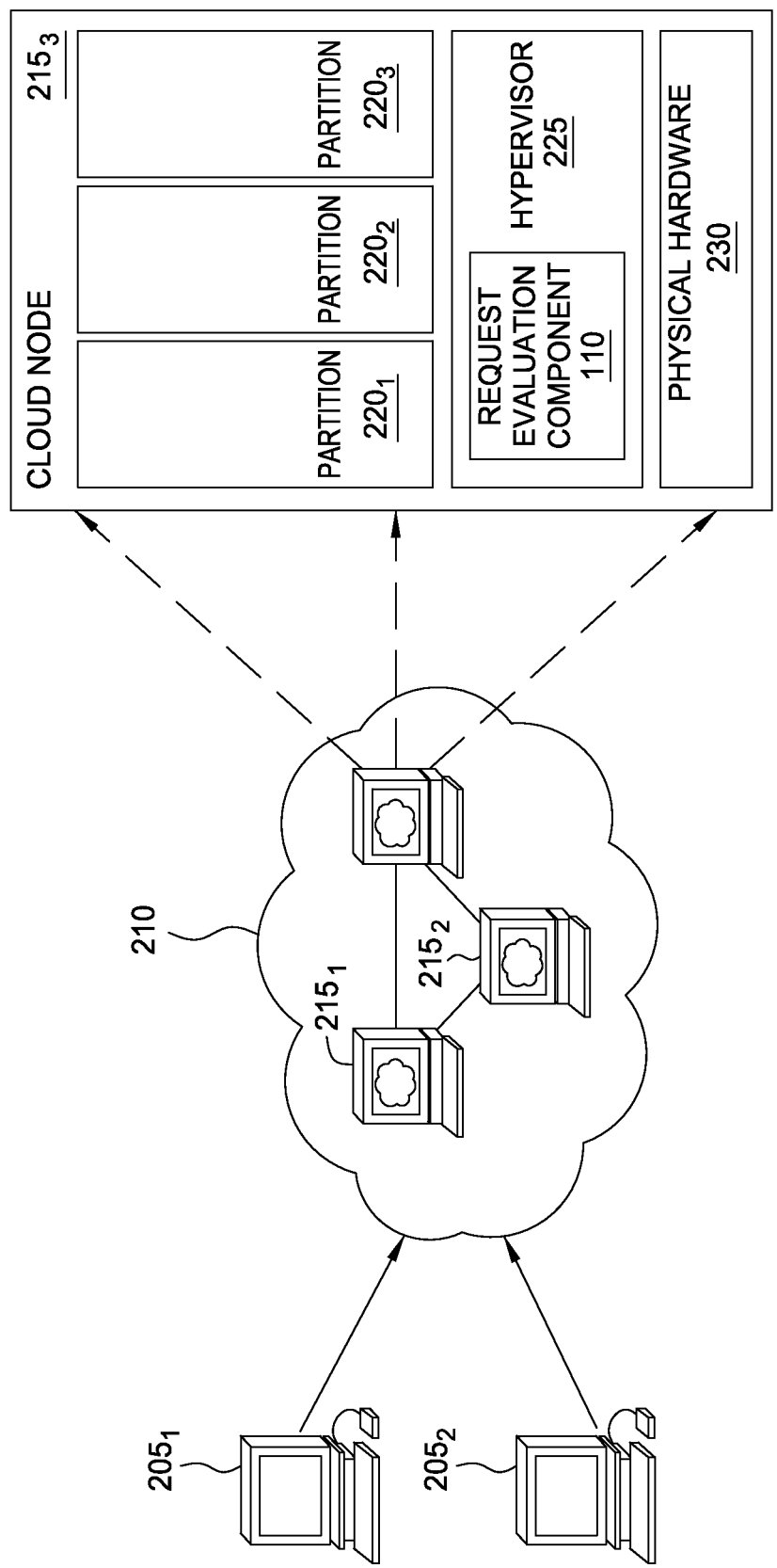
FIG. 2 illustrates a system configured to perform distributed request placement in a cloud, according to one embodiment of the present invention.

FIG. 2 illustrates a system configured to perform distributed request placement in a cloud, according to one embodiment of the present invention. As shown, the system 200 includes a plurality of client systems 205 which submit requests to the cloud 210 for instantiation. As shown, the cloud 210 contains a plurality of cloud nodes 215 (also referred to herein as "deployment nodes"). A magnified view of cloud node $215_3$ is shown, which contains a plurality of logical partitions 220, a hypervisor 225 and physical computing hardware 230. The logical partitions 220 generally represent virtual machines hosted on the cloud node $215_3$. The hypervisor 225 is generally tasked with managing the logical partitions 220 and their interaction with the physical computing hardware 230 of the cloud node $215_3$. Additionally, as depicted, the hypervisor 225 contains a request evaluation component 110, which is capable of performing any and/or all of the functions associated with a request evaluation component 110 described above. The physical hardware 230 generally represents physical computing resources of the cloud node $215_3$. These computing resources may include, for example, computer processors, system memory, storage devices, I/O devices, and so on.

Figure 3:
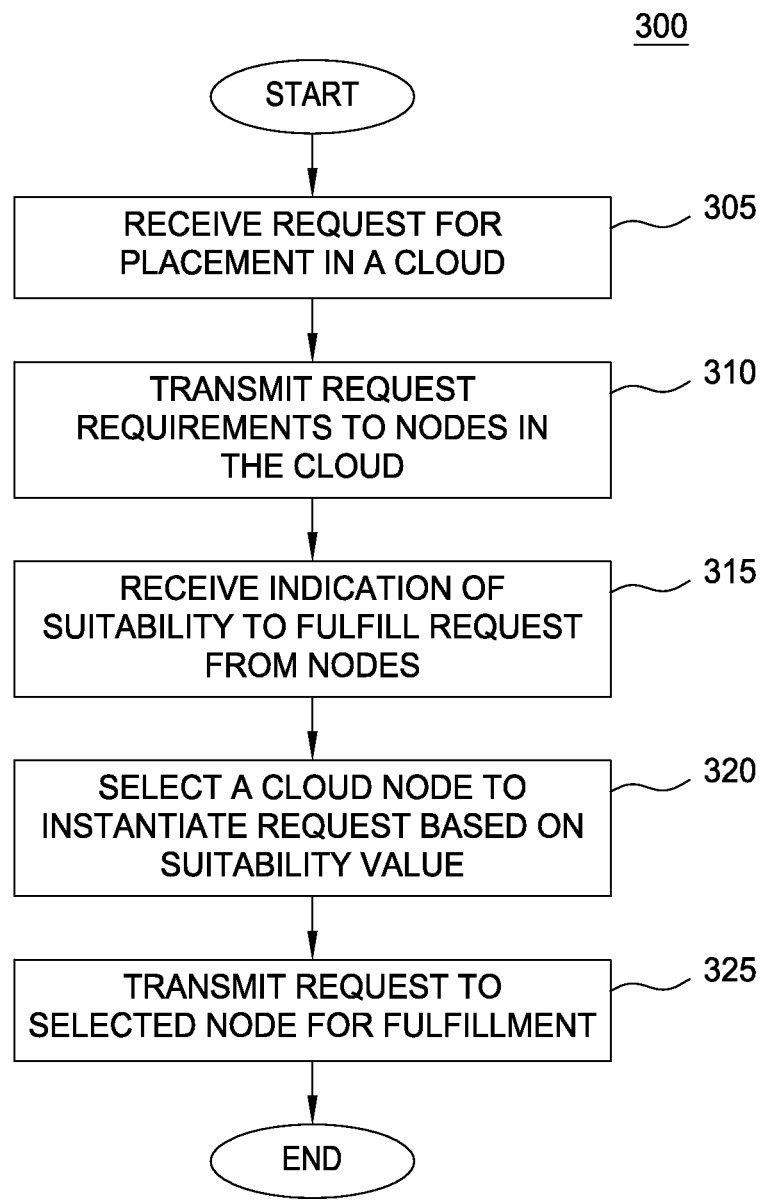
FIG. 3 is a flow chart illustrating a method for distributed request placement in a cloud, according to one embodiment of the present invention.

FIG. 3 is a flow chart illustrating a method for distributed request placement in a cloud, according to one embodiment of the present invention. As shown, the method 300 begins at step 305, where a request placement component 130 receives a request for placement in a cloud. As discussed above, the request placement component 130 may reside on a management system 120 that is separate from the deployment nodes 100 in the cloud. In one embodiment, the request placement component 130 may reside on one of the deployment nodes 100 in the cloud. Upon receiving the request, the request placement component 130 transmits one or more request requirements to deployment nodes of the cloud (step 310).

In one embodiment, the request specifies the resources needed for instantiating the request. In an embodiment where the request includes an image for a logical partition to be instantiated in the cloud, the resource requirements for the request may be based on the properties of the image. As an example, the logical partition image may specify that a virtual machine that operates with 4 CPU's and 8 GB of memory. In such an example, the request placement component 130 may determine that the node on which the request is instantiated should have at least 4 CPU's and 8 GB of memory available.

According to another embodiment of the invention, the request placement component 130 may determine the resource requirements for a particular request, based on particular characteristics of the request. For instance, the request placement component 130 may determine the resource requirements based on a classification of the request. As an example, the request placement component 130 may determine that all requests of a particular type should be placed on nodes having at least 2 CPU's and 4 GB of memory. The request placement component 130 may also determine the resource requirements based on the requesting entity from which the request was received. For instance, the request placement component 130 may determine that requests received from a particular customer should be placed on nodes having at least 1 CPU and 2 GB of memory, whereas requests from another customer should be placed on nodes having at minimum 4 CPU's and 12 GB of memory. Of course, these examples are for illustrative purposes only and are without limitation. Moreover, one of ordinary skill in the art will recognize that any number of other factors may be considered in addition to or in lieu of the aforementioned factors in determining the resource requirements for a particular request.

Once the request requirements are transmitted to the cloud nodes, the request placement component 130 receives an indication of suitability to fulfill the request from each of the cloud nodes (step 315). As discussed above, the indications of suitability may be calculated by a request evaluation component 110 residing on each of the nodes in the cloud. Additionally, the indication of suitability generally reflects the suitability of the respective cloud node for instantiating the request, based on the resource requirements associated with the request. Upon receiving the indications of suitability, the request placement component 130 selects one of the nodes in the cloud to instantiate the request (step 320). Generally, the request placement component 130 selects one of the nodes based upon the suitability values received. For instance, in one embodiment using a numeric suitability value, the request placement component 130 may select the cloud node with the highest suitability value (i.e., the node which indicated it was most suitable for processing the request). Once the request placement component 130 has selected a node, the request placement component 130 then transmits the request to the selected node for instantiation (step 325) and the method 300 ends.

Figure 4:
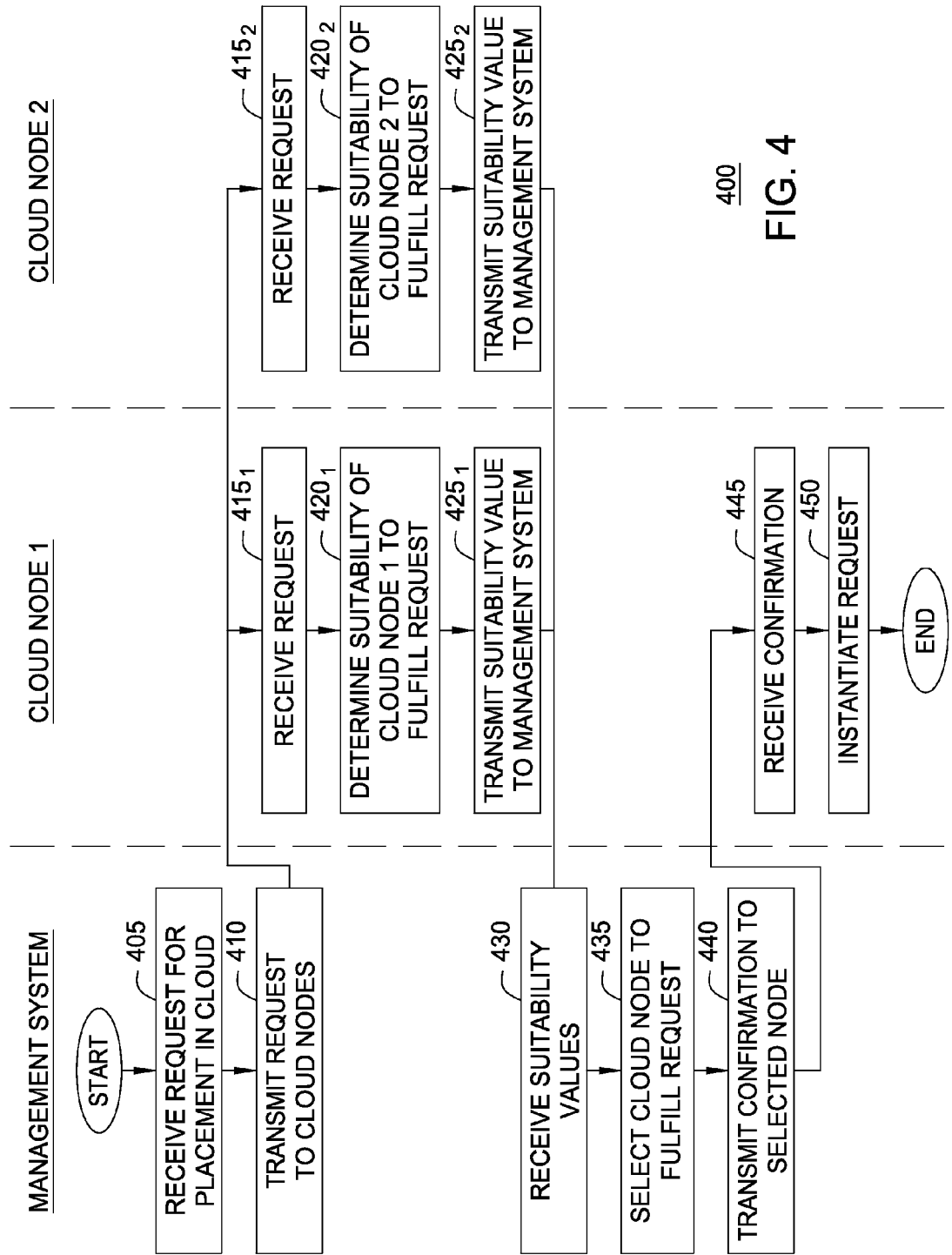
FIG. 4 is a flow chart illustrating a method for distributed request placement in a cloud, according to one embodiment of the present invention.

FIG. 4 is a flow chart illustrating a method for distributed request placement in a cloud, according to one embodiment of the present invention. As shown, the method 400 begins at step 405, where the request placement component 130 receives a request for placement in the cloud. Upon receiving the request, the request placement component 130 transmits the request to cloud node 1 and cloud node 2 (step 410). For the purposes of this example, only two nodes within the cloud are shown. However, one of ordinary skill in the art will recognize that the request placement component 130 may transmit the request to any number of cloud nodes, which may include a portion or the entirety of all of the nodes in the cloud.

At step 415, cloud node 1 and cloud node 2 receive the request. Upon receiving the request, each of the nodes determines their own suitability to instantiate the request (step 420). As discussed above, the nodes may determine the suitability value based on the capability of the node to satisfy the resource requirements for the request. For instance, assume the resource requirements for a particular request specify that the node must have 2 CPU's available to instantiate the request. If a node then only has 1 CPU available, the node may generate a suitability value that indicates the node is not suitable for instantiating the request.

Additionally, the nodes may determine the suitability value based on a current workload of the node. For instance, it may be optimal for certain cloud computing environments to distribute workloads evenly across all of the nodes, to the extent possible. In such an environment, if cloud node 2 node has the sufficient available resources to instantiate the request, but is currently experiencing a high overall workload, the cloud node 2 may generate a suitability value indicating the node is less suitable for instantiating the request at step $420_2$. Likewise, if cloud node 1 has the sufficient available resource to instantiate the request and is experiencing a low overall workload, the cloud node 1 may generate a suitability value indicating that it is more suitable for instantiating the request at step $420_1$.

The nodes may further generate the suitability value based on the availability of resources related to the request. For instance, an exemplary request may contain an image for a virtual machine that interacts with a particular database. If the database operates locally on cloud node 1, then cloud node 1 may generate a suitability value that indicates that it is more suitable for instantiating the request. Likewise, if cloud node 2 only has remote access to the database (e.g., network access over the Internet), cloud node 2 may generate a suitability value indicating it is less suitable for instantiating the request. Continuing the example further, in the event that cloud node 2 does not have access at all to the database, node 2 may generate a suitability value indicating that it is not suitable at all for instantiating the request, as it cannot satisfy one of the requirements of the request. Of course, the above examples are all provided without limitation and for illustrative purposes only. Moreover, one of ordinary skill in the art will quickly recognize that any number of other scenarios and outcomes may occur consistent with the functions described herein.

In any event, once the suitability of the nodes is determined, the nodes then transmit their respective generated suitability value to the management system (step 425). The management system receives the suitability values from each of the nodes (step 430), and then selects one of the nodes for fulfilling the request, based on the received suitability values (step 435). As one example, in an embodiment where the suitability values are numeric values, the management system may select the node whose numeric suitability value is the highest (e.g., the node that is most suitable for instantiating the request). In the present example, the management system selects cloud node 1, and transmits a confirmation signal to cloud node 1 to instantiate the request (step 440).

In the depicted example, since the management system previously transferred the request to each of the cloud nodes, the management system only needs to notify the selected node to proceed with instantiating the request at step 440. However, as discussed above, in particular embodiments, the management system may initially only send out the resource requirements of the request for use by the nodes in calculating their respective suitability values. Such a technique may be advantageous, for instance, when the request is substantial in size, and thus transferring the request to a plurality of nodes may create a substantial amount of network traffic. For instance, if the request includes an image for a virtual machine, it may be advantageous for the management system to only transfer a description of the request and any resource requirements of the request to each of the cloud nodes, so as to minimize the amount of network traffic required. Alternatively, the management system may make the request available on a shard storage device, and may transmit a link to each of the nodes for use in calculating their respective suitability values for instantiating the request. Doing so allows the nodes to access and examine the request as needed, while still minimizing the amount of network traffic.

Returning to the present example, cloud node 1 then receives the confirmation signal from the management system (step 445). Upon receiving the confirmation signal, cloud node 1 instantiates the request (step 450), and the method 400 ends. In an embodiment where the request includes an image of a logical partition, instantiating the request may include configuring and starting the logical partition on the selected cloud node.

Figure 5:
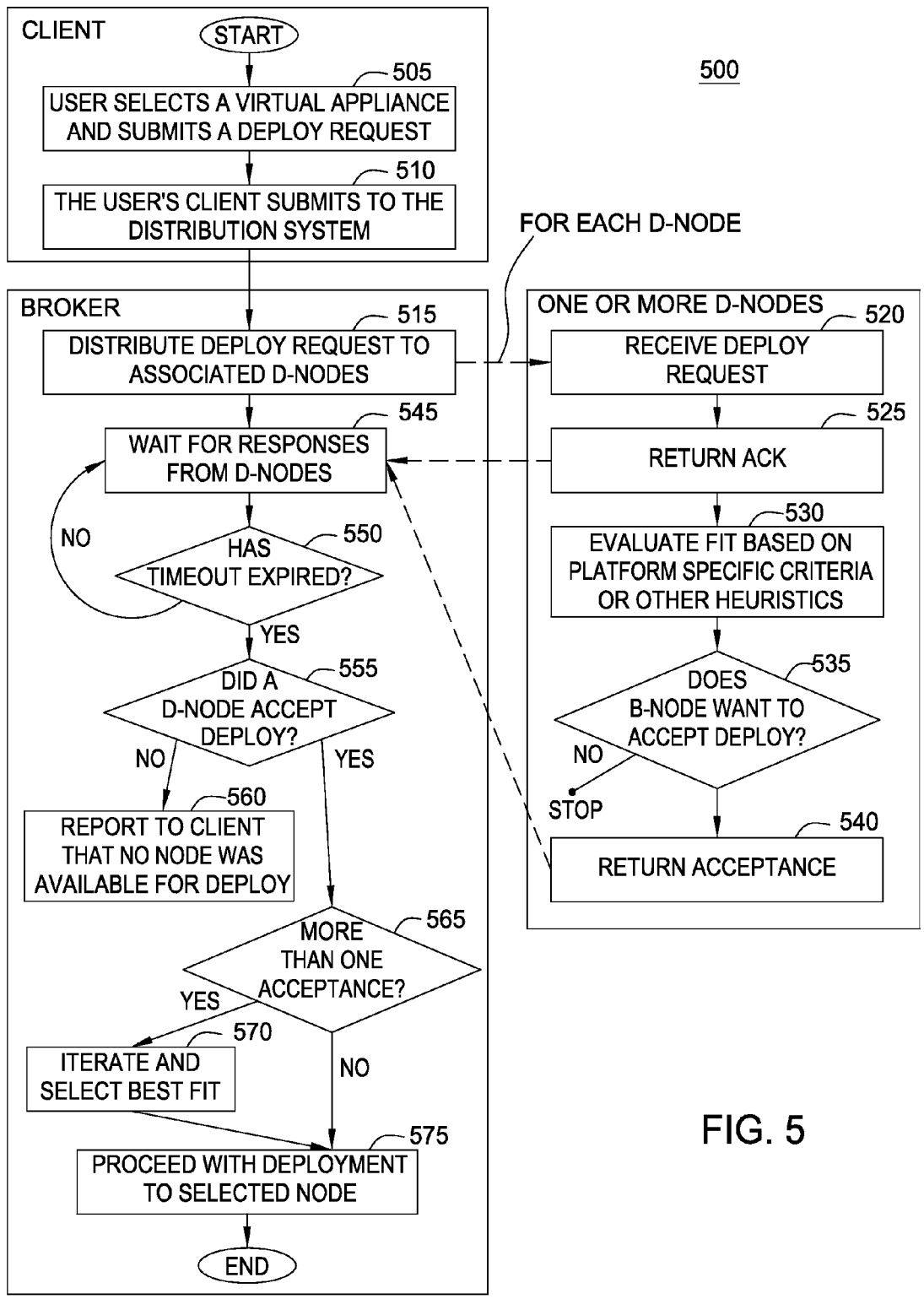
FIG. 5 is a flow chart illustrating a method for distributed request placement in a cloud, according to one embodiment of the present invention.

FIG. 5 is a flow chart illustrating a method for distributed request placement in a cloud, according to one embodiment of the present invention. As shown, the method 500 begins at step 505, where a user selects a virtual appliance and submits a deploy request. The user may select the virtual appliance from a list of preconfigured virtual appliances. For instance, the user may select a preconfigured virtual appliance with a standard installation of the Linux® operating system. (Note: Linux is a trademark of Linus Torvalds in the United States and other countries.) In another embodiment, the user may provide a data image for the virtual appliance to be instantiated in the cloud. In any event, once the user submits the deploy request, the user client submits the request to the distribution system for placement in the cloud (step 510).

A broker system then receives the request and distributes the request to deployment nodes of the cloud (step 515). The method 500 continues, where for each of the deployment nodes, the node receives the deployment request (step 520) and acknowledges the receipt of the request to the broker system (step 525). Each node then evaluates its own fitness for instantiating the request, based on platform specific criteria or other heuristics associated with the request (step 530). As discussed above, these criteria may include resource requirements for the request, workload information for the node, availability of related resources, and so on. The node then determines whether it is suitable to accept the request for deployment (step 535). For instance, if the request is associated with particular resource requirements which the node cannot satisfy, the node may determine it is not suitable for instantiating the request. If instead the node determines it is suitable for instantiating the request, the node returns an acceptance signal to the broker system (step 540).

Returning to the broker system, after distributing the request to the deployment nodes, the broker system waits for responses from the deployment nodes (step 545). In the depicted embodiment, the request contains a Time-To-Live ("TTL") value, which specifies an amount of time the broker system waits for responses from each of the deployment nodes. At step 550, the broker system determines whether the TTL has expired. If not, the method returns to step 545 and the broker system continues to wait for responses from the nodes.

Once the time expires, the broker system determines whether any of the deployment nodes returned an acceptance signal for the request (step 555). If not, the broker system reports to the client that no suitable node was available in the cloud for deploying the request (step 560). If instead at least one node returned an acceptance signal, the broker system determines whether more than one node returned an acceptance signal for the request (step 565). If not, the broker system selects the single node that returned an acceptance signal and proceeds to deploy the virtual appliance on the single node (step 575). If more than one node returned an acceptance signal for the request, the broker system iterates through all of the accepting nodes and selects the node that is best suited for instantiating the request (step 570). As discussed above, in one embodiment, the broker system may make this selection based on a suitability value returned by each of the nodes, and by selecting the node with the highest suitability value (indicating that the node is best suited for instantiating the request).

Once a node is selected, the broker system proceeds with deployment of the virtual appliance on the selected node (step 575). Once the request is deployed to the selected node, to method 500 ends. In one embodiment, if the broker system determines that the selected node is then unavailable to instantiate the virtual appliance (e.g., in the event of a system failure of the selected node), the broker system may then continue to iterate through accepting nodes to select the available node that is best suited for instantiating the virtual appliance.

Figure 6:
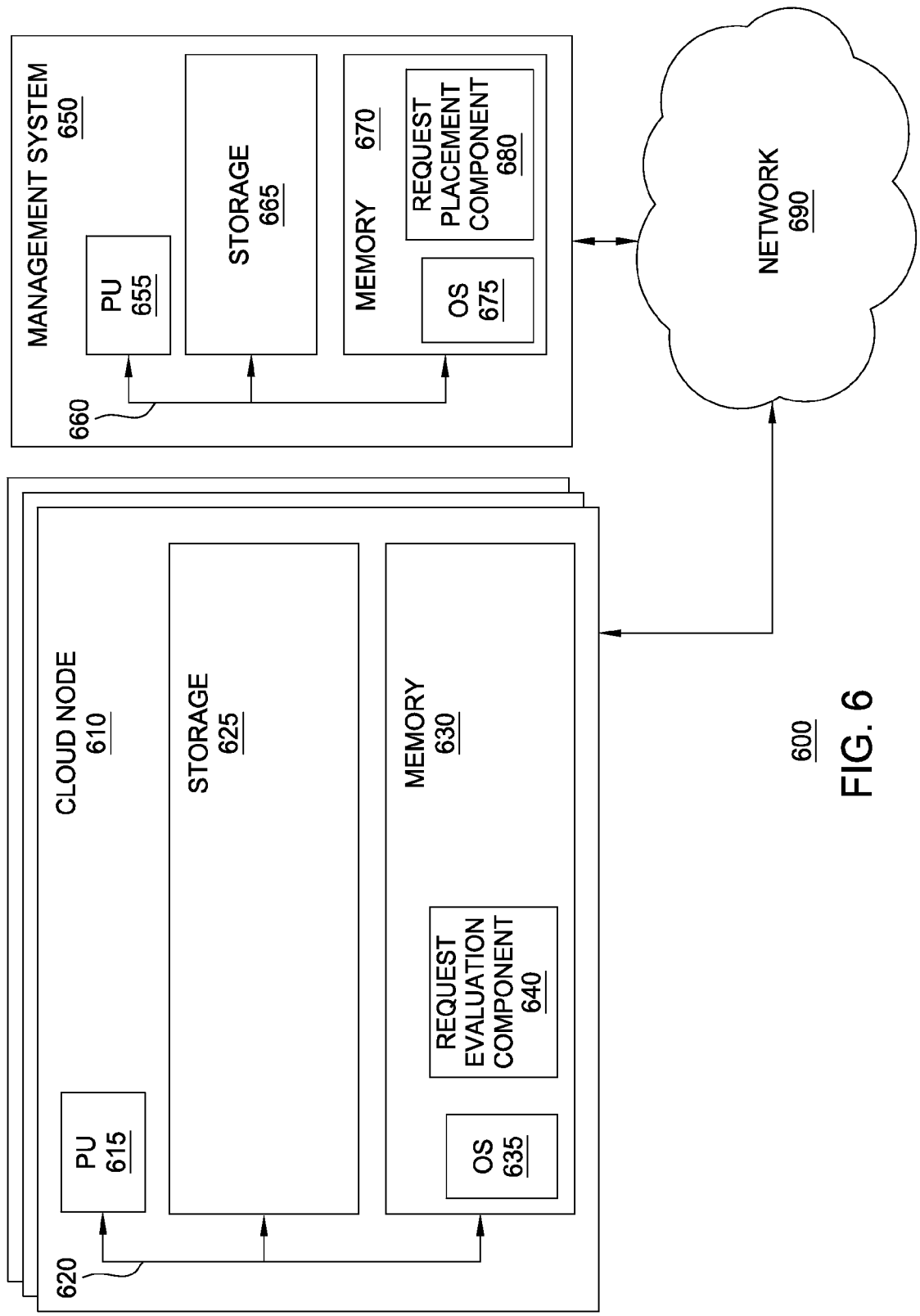
FIG. 6 is a block diagram illustrating a cloud computing environment configured to perform distributed request placement, according to one embodiment of the present invention.

FIG. 6 is a block diagram illustrating a cloud computing environment configured to perform distributed request placement, according to one embodiment of the present invention. As shown, network environment 600 includes network devices 610, a network 670, and an analysis system 660. In one embodiment, the environment 600 may include existing computer systems, e.g., desktop computers, server computers, laptop computers, tablet computers, gaming consoles, hand-held gaming devices and the like. The network environment 600 illustrated in FIG. 6, however, is merely an example of one network environment in which embodiments of the present invention may be used. Embodiments of the present invention may be implemented differently, regardless of whether the computer systems are complex multi-user computing systems, such as a cluster of individual computers connected by a high-speed network, single-user workstations, or network appliances lacking non-volatile storage.

As shown, each network device 610 includes a processing unit 615, which obtains instructions and data via a bus 620 from a memory 630 and storage 625. Processing unit 615 is a programmable logic device that performs instruction, logic, and mathematical processing, and may be representative of one or more CPUs. Storage 625 stores application programs and data for use by network device 610. The memory 630 is any memory sufficiently large to hold the necessary programs and data structures. Memory 630 could be one or a combination of memory devices, including Random Access Memory, nonvolatile or backup memory (e.g., programmable or Flash memories, read-only memories, etc.). In addition, memory 630 and storage 625 may be considered to include memory physically located elsewhere; for example, on another computer coupled to the network device 610 via bus 620.

Client storage 625 includes hard-disk drives, flash memory devices, optical media and the like. Client computer 610 is operably connected to the network 655. Client memory 630 includes an operating system (OS) 635, a microblog component 115 and an event detection component 110. Operating system 635 is the software used for managing the operation of the network device 610. Examples of OS 635 include UNIX, a version of the Microsoft Windows® operating system, and distributions of the Linux® operating system.

As shown, the analysis system 640 includes the same basic hardware elements as the network devices 610. Specifically, the analysis system 640 includes a processing unit 645 (representative of one or more CPUs and/or GPUs), a memory 660 and storage 655 connected via a bus 650. The analysis system 640 may be operably connected to the network 670, which generally represents any kind of data communications network. Accordingly, the network 670 may represent both local and wide area networks, including the Internet. In one embodiment, the analysis system 640 hosts a microblog analysis component 130 which subscribes to messages sent from one or more of the network devices 610 using the microblog component 115.

Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

Cloud computing node 610 is operational with numerous other general purpose or special purpose computing system environments or configurations. Examples of well-known computing systems, environments, and/or configurations that may be suitable for use with cloud computing node 610 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Cloud computing node 610 may be described in the general context of computer system-executable instructions, such as program modules, being executed by a computer system. Generally, program modules may include routines, programs, objects, components, logic, data structures, and so on that perform particular tasks or implement particular abstract data types. Cloud computing node 610 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, cloud node 610 is shown in the form of a general-purpose computing device. The components of cloud node 610 may include, but are not limited to, one or more processors or processing units 615, a system memory 630, and a bus 620 that couples various system components including system memory 630 to processor 615.

Bus 620 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Cloud node 610 typically includes a variety of computer system readable media. Such media may be any available media that is accessible by cloud node 610, and it includes both volatile and non-volatile media, removable and non-removable media.

System memory 630 can include computer system readable media in the form of volatile memory, such as random access memory (RAM) and/or cache memory. Cloud node 610 may further include other removable/non-removable, volatile/non-volatile computer system storage media. By way of example only, storage system 625 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 620 by one or more data media interfaces. As will be further depicted and described below, memory 630 may include at least one program product having a set (e.g., at least one) of program modules that are configured to carry out the functions of embodiments of the invention.

As depicted in FIG. 6, memory 630 contains an operating system 635 and a request evaluation component 640. Of course, the components shown residing in memory 630 are without limitation and are shown for illustrative purposes only. Moreover, one of ordinary skill in the art will quickly recognize that memory 630 may also contain one or more application programs, other program modules, and program data. Additionally, each of the operating system, one or more application programs, other program modules, and program data or some combination thereof, may include an implementation of a networking environment. Request evaluation component 640 may generally carry out the functions and/or methodologies of embodiments of the invention as described herein.

Cloud node 610 may also communicate with one or more external devices such as a keyboard, a pointing device, a display, etc.; one or more devices that enable a user to interact with cloud node 610; and/or any devices (e.g., network card, modem, etc.) that enable cloud node 610 to communicate with one or more other computing devices. Such communication can occur via I/O interfaces. Still yet, cloud node 610 can communicate with one or more networks 690 such as a local area network (LAN), a general wide area network (WAN), and/or a public network (e.g., the Internet) via a network adapter. Such a network adapter may communicate with the other components of cloud node 610 via bus 620. It should be understood that although not shown, other hardware and/or software components could be used in conjunction with cloud node 610. Examples, include, but are not limited to: microcode, device drivers, redundant processing units, external disk drive arrays, RAID systems, tape drives, and data archival storage systems, etc.

As shown, the management system 650 includes the same basic hardware elements as the cloud nodes 610. Specifically, the management system 650 includes a processing unit 655 (representative of one or more CPUs and/or GPUs), a memory 670 and storage 665 connected via a bus 660. The management system 650 may be operably connected to the network 690, which generally represents any kind of data communications network. Accordingly, the network 690 may represent both local and wide area networks, including the Internet. As shown, the management system 650 hosts a request placement component 680 configured to communicate with request evaluation components 640 on the cloud nodes 610 to place incoming requests on the node 610 best suited for instantiating the request.

Figure 7:
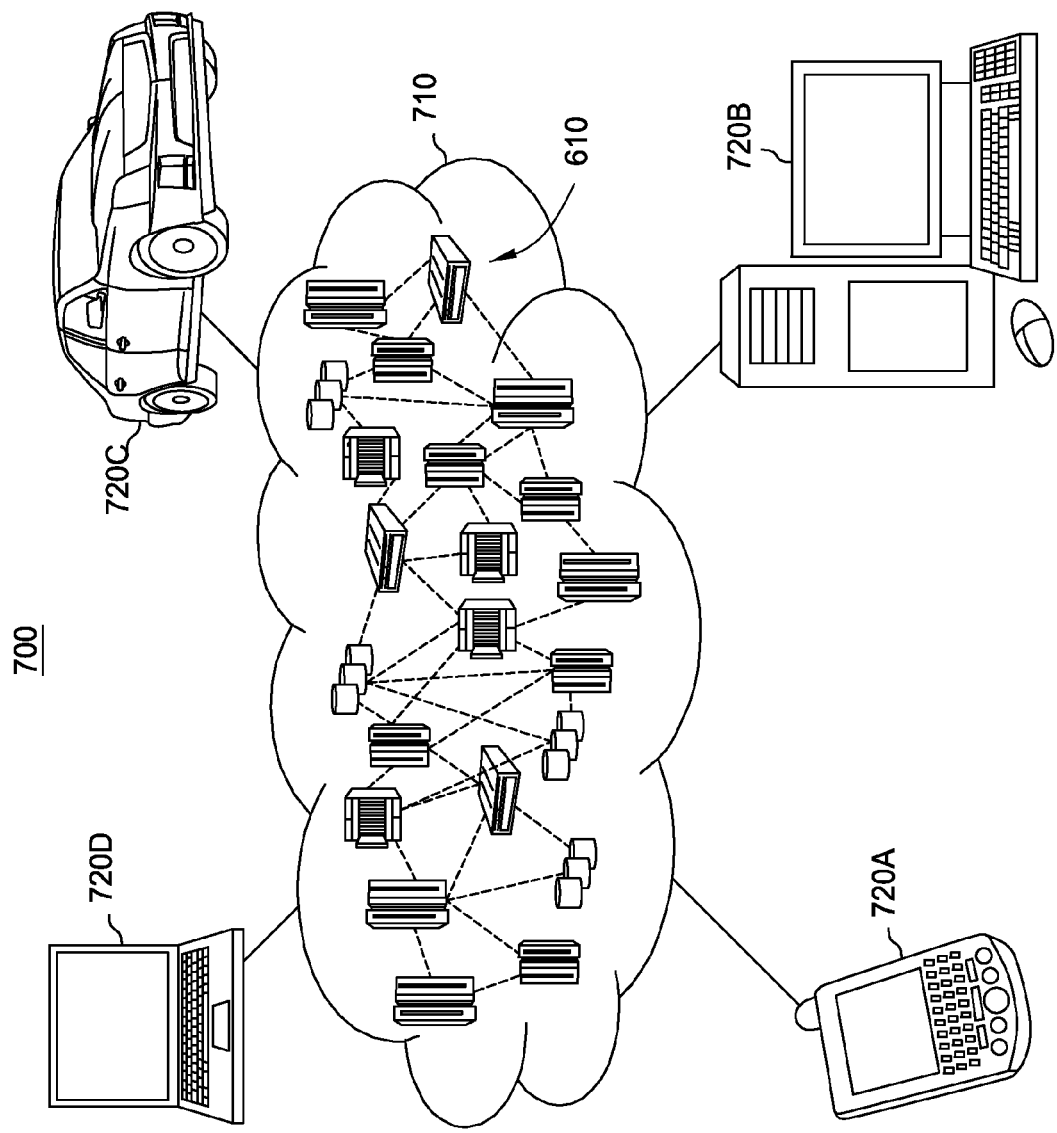
FIG. 7 depicts a cloud computing environment, according to one embodiment of the present invention.

Referring now to FIG. 7, an illustrative computing system 700 including a cloud computing environment 710 is depicted. As shown, cloud computing environment 710 comprises one or more cloud computing nodes 610 with which local computing devices used by cloud consumers, such as, for example, personal digital assistant (PDA) or cellular telephone 720A, desktop computer 720B, laptop computer 720C, and/or automobile computer system 720N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 710 to offer infrastructure, platforms and/or software as services for which a cloud consumer does not need to maintain resources on a local computing device. It is understood that the types of computing devices 720A-N shown in FIG. 7 are intended to be illustrative only and that computing nodes 610 and cloud computing environment 710 can communicate with any type of computerized device over any type of network and/or network addressable connection (e.g., using a web browser).

Figure 8:
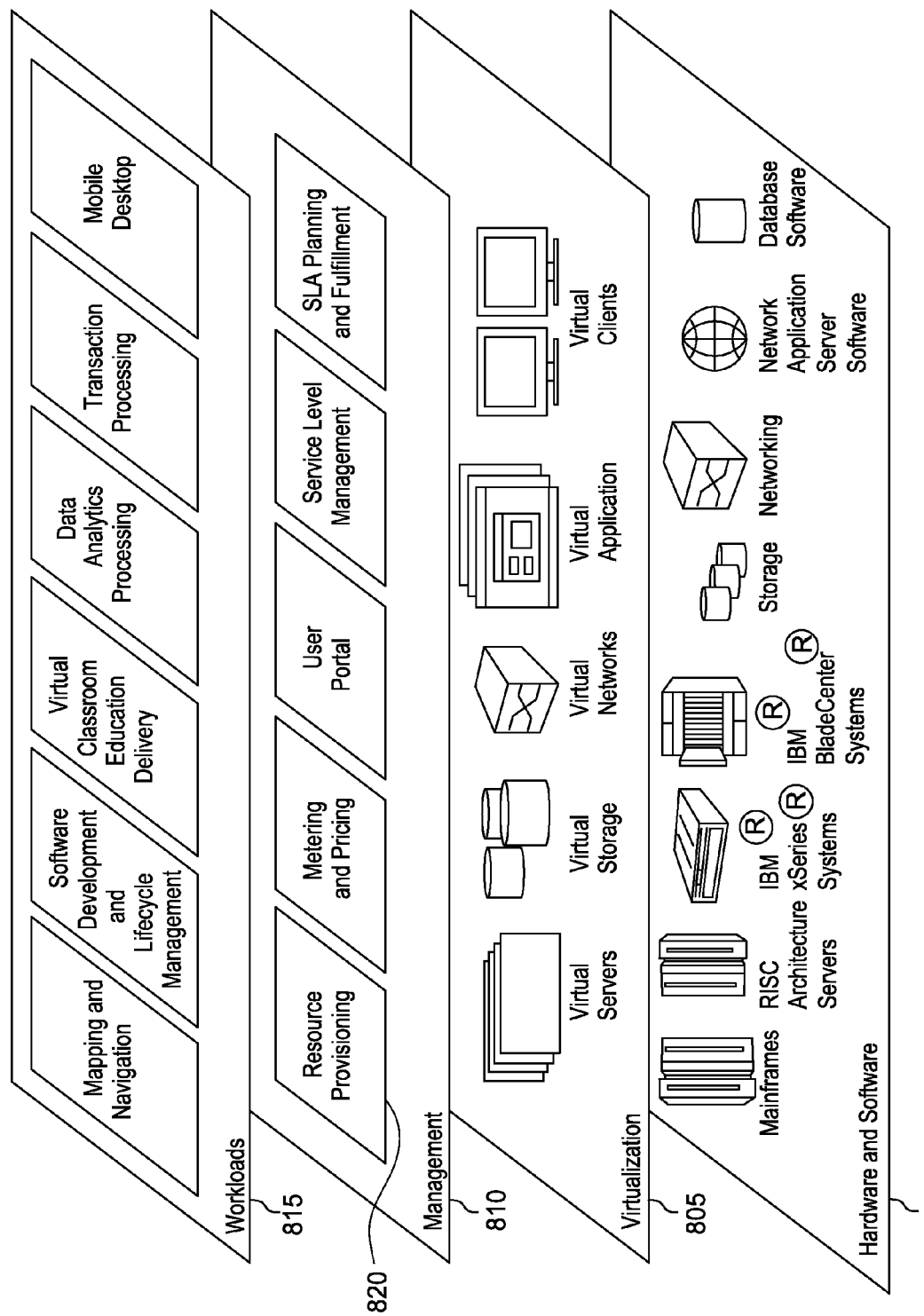
FIG. 8 depicts abstraction model layers, according to one embodiment of the present invention.

Referring now to FIG. 8, a set of functional abstraction layers provided by cloud computing environment 710 (FIG. 7) is shown. It should be understood in advance that the components, layers, and functions shown in FIG. 8 are intended to be illustrative only and embodiments of the invention are not limited thereto. As depicted, the following layers and corresponding functions are provided.

Hardware and software layer 800 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software (IBM, zSeries, pSeries, xSeries, BladeCenter, WebSphere, and DB2 are trademarks of International Business Machines Corporation registered in many jurisdictions worldwide).

Virtualization layer 805 provides an abstraction layer from which the following examples of virtual entities may be provided: virtual servers; virtual storage; virtual networks, including virtual private networks; virtual applications and operating systems; and virtual clients.

In one example, management layer 810 may provide the functions described below. Resource provisioning provides dynamic procurement of computing resources and other resources that are utilized to perform tasks within the cloud computing environment. In accordance with embodiments of the present invention, resource provisioning may include a request placement component capable of performing any or all of the functions described herein. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 815 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

In the preceding, reference is made to embodiments of the invention. However, it should be understood that the present disclosure is not limited to specific described embodiments. Instead, any combination of the following features and elements, whether related to different embodiments or not, is contemplated to implement and practice the disclosure. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments may be devised without departing from the basic scope thereof. In view of the foregoing, the scope of the present disclosure is determined by the claims that follow.

What is claimed is:

1. A method for instantiating a request on a deployment node of a plurality of deployment nodes, wherein the request specifies one or more resource requirements, comprising:
   transmitting, in response to the request, at least an indication of the resource requirements specified in the request to a plurality of deployment nodes;
   receiving, from each of at least two of the plurality of deployment nodes, an indication of suitability of the respective deployment node for instantiating the request in response to the transmitting;
   selecting, by operation of one or more computer processors, a first one of the at least two deployment nodes for instantiating the request, based at least in part on the received indications of suitability; and
   transmitting the request to the first selected deployment node for instantiation.

2. The method of claim 1, further comprising:
   determining that the selected deployment node is unavailable for instantiating the request;
   selecting a second one of the at least two deployment nodes for instantiating the request, wherein the second selected deployment node is separate from the first selected deployment node; and
   transmitting the request to the second selected deployment node for instantiation.

3. The method of claim 1, wherein the indication of suitability is based on a current workload of the respective deployment node.

4. The method of claim 1, wherein the indication of suitability is based on at least one of an overprovisioning optimization objective and an energy management objective.

5. The method of claim 1, wherein the request further specifies a location of a request entity from which the request was received, and wherein the indication of suitability is based on at least one of:
   a network proximity between the respective deployment node and the location specified in the request; and
   a physical proximity between the respective deployment node and the location specified in the request.

6. The method of claim 1, wherein the received request further specifies a Time-to-Live ("TTL") value, whereby the request is discarded upon expiration of the TTL value.

7. The method of claim 1, wherein the request includes an image of a virtual machine, and wherein the resource requirements specified in the request comprise the resource requirements of the virtual machine.

8. The method of claim 7, wherein the resource requirements specified in the request comprise the resources necessary to instantiate the virtual machine.

9. A computer program product for instantiating a request on a deployment node of a plurality of deployment nodes, wherein the request specifies one or more resource requirements, comprising:
   a computer-readable storage medium having computer readable program code embodied therewith, the computer readable program code comprising:
   computer readable program code to transmit, in response to the request, at least an indication of the resource requirements specified in the request to a plurality of deployment nodes;
   computer readable program code to receive, from each of at least two of the plurality of deployment nodes, an indication of suitability of the respective deployment node for instantiating the request in response to the transmitting;
   computer readable program code to select a first one of the at least two deployment nodes for instantiating the request, based at least in part on the received indications of suitability; and
   computer readable program code to transmit the request to the first selected deployment node for instantiation.

10. The computer program product of claim 9, further comprising:
    computer readable program code to determine that the selected deployment node is unavailable for instantiating the request;
    computer readable program code to select a second one of the at least two deployment nodes for instantiating the request, wherein the second selected deployment node is separate from the first selected deployment node; and
    computer readable program code to transmit the request to the second selected deployment node for instantiation.

11. The computer program product of claim 9, wherein the indication of suitability is based on a current workload of the respective deployment node.

12. The computer program product of claim 9, wherein the indication of suitability is based on at least one of an overprovisioning optimization objective and an energy management objective.

13. The computer program product of claim 9, wherein the request further specifies a location of a request entity from which the request was received, and wherein the indication of suitability is based on at least one of:
    a network proximity between the respective deployment node and the location specified in the request; and
    a physical proximity between the respective deployment node and the location specified in the request.

14. The computer program product of claim 9, wherein the received request further specifies a Time-to-Live ("TTL") value, whereby the request is discarded upon expiration of the TTL value.

15. The computer program product of claim 9, wherein the request includes an image of a virtual machine, and wherein the resource requirements specified in the request comprise the resource requirements of the virtual machine.

16. The computer program product of claim 15, wherein the resource requirements specified in the request comprise the resources necessary to instantiate the virtual machine.

17. A system, comprising:
    a computer processor; and
    a memory containing a program that, when executed on the computer processor, performs an operation for instantiating a request on a deployment node of a plurality of deployment nodes, wherein the request specifies one or more resource requirements, comprising:
    transmitting from a request placement component, in response to the request, at least an indication of the resource requirements specified in the request to the plurality of deployment nodes;
    receiving, from each of at least two of the plurality of deployment nodes, an indication of suitability of the respective deployment node for instantiating the request in response to the transmitting;
    selecting, by the request placement component, a first one of the at least two deployment nodes for instantiating the request, based at least in part on the received indications of suitability; and
    transmitting the request from the request placement component to the first selected deployment node for instantiation.

18. The system of claim 17, the operation further comprising:
    determining that the selected deployment node is unavailable for instantiating the request;
    selecting, by the request placement component, a second one of the at least two deployment nodes for instantiating the request, wherein the second selected deployment node is separate from the first selected deployment node; and
    transmitting the request from the request placement component to the second selected deployment node for instantiation, wherein logic and data relating to particular capabilities and workloads of the plurality of deployment nodes are absent from the request placement component.

19. The system of claim 17, wherein the indication of suitability is based on a current workload of the respective deployment node, and wherein a substitute request placement component is spawned on another deployment node of the plurality of deployment nodes in response to failure of a host deployment node of the plurality of deployment nodes which hosted the request placement component.

20. The system of claim 17, wherein the indication of suitability is based on at least one of an overprovisioning optimization objective and an energy management objective.

21. The system of claim 17, wherein the request further specifies a location of a request entity from which the request was received, and wherein the indication of suitability is based on at least one of:
   a network proximity between the respective deployment node and the location specified in the request; and
   a physical proximity between the respective deployment node and the location specified in the request.

22. The system of claim 17, wherein the received request further specifies a Time-to-Live ("TTL") value, whereby the request is discarded upon expiration of the TTL value.

23. The system of claim 17, wherein the request includes an image of a virtual machine, and wherein the resource requirements specified in the request comprise the resource requirements of the virtual machine.

24. The system of claim 23, wherein the resource requirements specified in the request comprise the resources necessary to instantiate the virtual machine.

25. A method for instantiating a request at a deployment node, comprising:
   receiving, in response to the request, at the deployment node at least an indication of one or more resource requirements for instantiating the request;
   calculating, by operation of one or more computer processors at the deployment node using a request evaluation component residing on the deployment node, a suitability indicator describing the suitability of the deployment node for instantiating the request in response to receiving at the deployment node at least an indication of one or more resource requirements for instantiating the request;
   transmitting the calculated suitability indicator from the deployment node to a management node;
   receiving the request to be instantiated from the management node in response to transmitting the calculated suitability indicator from the deployment node to the management node; and
   instantiating the request at the deployment node in response to receiving the request to be instantiated from the management node.

26. The method of claim 25, further comprising:
   metering use of the deployment node associated with the request; and
   generating an invoice based on the metered use.

27. A method for deploying computing infrastructure, comprising integrating computer readable code into a computing system, wherein the code in combination with the computing system is adapted to perform the method of claim 25.

* * * * *